(12) United States Patent
Clendenen et al.

(10) Patent No.: US 9,735,725 B2
(45) Date of Patent: Aug. 15, 2017

(54) METHODS AND SYSTEMS FOR TRANSIENT VOLTAGE PROTECTION

(71) Applicant: Regal Beloit America, Inc., Beloit, WI (US)

(72) Inventors: David Allen Clendenen, Fort Wayne, IN (US); Yao Da, Fort Wayne, IN (US); Ludovic Andre Chretien, Columbia City, IN (US); Ming Li, Fort Wayne, IN (US); Steven P. Richardville, LaOtto, IN (US); Roger Carlos Becerra, Fort Wayne, IN (US); Glen Chester Young, Fort Wayne, IN (US)

(73) Assignee: Regal Beloit America, Inc., Beloit, WI (US)

(\*) Notice: Subject to any disclaimer, the term of this patent is extended or adjusted under 35 U.S.C. 154(b) by 146 days.

(21) Appl. No.: 14/160,188

(22) Filed: Jan. 21, 2014

(65) Prior Publication Data

US 2015/0207449 A1    Jul. 23, 2015

(51) Int. Cl.
*H02H 3/10* (2006.01)
*H02P 29/024* (2016.01)
*H02H 7/122* (2006.01)
*H02H 7/125* (2006.01)

(52) U.S. Cl.
CPC ......... *H02P 29/024* (2013.01); *H02H 7/1222* (2013.01); *H02H 7/1252* (2013.01); *H02P 29/0241* (2016.02)

(58) Field of Classification Search
CPC ........ H02H 7/1222; H02H 9/04; H02M 5/458
See application file for complete search history.

(56) References Cited

U.S. PATENT DOCUMENTS

| | | | | |
|---|---|---|---|---|
| 5,969,959 | A * | 10/1999 | Odegard et al. | 363/51 |
| 6,040,988 | A * | 3/2000 | Rees et al. | 363/37 |
| 6,266,223 | B1 | 7/2001 | Curry | |
| 7,312,970 | B2 | 12/2007 | Skinner | |
| 8,223,468 | B2 * | 7/2012 | Januszewski | H02H 9/005 361/111 |
| 8,345,400 | B2 * | 1/2013 | Veskovic | 361/118 |
| 8,466,489 | B2 | 6/2013 | Salcedo et al. | |
| 8,520,355 | B2 | 8/2013 | Wright et al. | |
| 8,780,592 | B1 * | 7/2014 | Jones | H02J 3/383 323/906 |
| 8,963,478 | B2 * | 2/2015 | Becerra et al. | 318/762 |

(Continued)

*Primary Examiner* — Eduardo Colon Santana
*Assistant Examiner* — Charles S Laughlin
(74) *Attorney, Agent, or Firm* — Armstrong Teasdale LLP

(57) ABSTRACT

Protection of an electric motor drive controller from a transient voltage is described herein. The transient voltage is provided by an alternating current (AC) power line that includes a line conductor, a neutral conductor, and a ground conductor. The transient voltage protection system includes a first stage protection device coupled to an input of a rectifier of the motor drive controller. The first stage protection device is configured to suppress the transient voltage to prevent damage to the motor drive controller. The transient voltage protection system also includes a second stage protection device coupled between the rectifier and an inverter of the motor drive controller. The second stage protection device is configured to further suppress the transient voltage to prevent damage to the inverter.

14 Claims, 2 Drawing Sheets

(56) References Cited

U.S. PATENT DOCUMENTS

| | | | |
|---|---|---|---|
| 2004/0095784 A1* | 5/2004 | Zhou | 363/37 |
| 2005/0073793 A1* | 4/2005 | Masghati | 361/119 |
| 2005/0105229 A1* | 5/2005 | Deng et al. | 361/90 |
| 2008/0211449 A1* | 9/2008 | Yamai | H02M 5/458 318/767 |
| 2009/0262473 A1* | 10/2009 | Weinert | H02H 9/008 361/56 |
| 2011/0227551 A1* | 9/2011 | Black | H01H 79/00 323/304 |
| 2012/0026639 A1* | 2/2012 | Wright | H02H 9/041 361/118 |
| 2012/0063178 A1* | 3/2012 | Fujita | H02M 5/4585 363/37 |
| 2012/0086382 A1 | 4/2012 | Peto | |
| 2013/0279215 A1* | 10/2013 | Skjellnes | H02M 1/32 363/37 |
| 2014/0247522 A1* | 9/2014 | Simi | 361/18 |

\* cited by examiner

METHODS AND SYSTEMS FOR TRANSIENT VOLTAGE PROTECTION

BACKGROUND

The field of the disclosure relates generally to protecting an electric motor drive controller from damage, and more specifically, to protecting an electric motor drive controller and connected electronics from transient and/or ringing voltages.

Electric motors are used in numerous varieties and applications worldwide. For example, electric motors are included within heating, ventilation, and air conditioning (HVAC) applications. A typical HVAC application includes a thermostat, a furnace or a fan coil, a system controller, a motor controller, and at least one electric motor. Since the motor controller is a component within a larger system, the motor controller may be subject to transient voltages caused by, for example, power system switching and/or lightning strikes. Switching transients may be caused by power system switching, load changes in power distribution systems, and/or short circuit fault conditions. Furthermore, the motor controller may be subject to transient voltages caused by events external to the HVAC application, for example, power surges. Power surges may be caused by different external forces, most typically, from lightning strikes. Lightning strike transients may result from a direct strike or induced voltages and currents due to an indirect lightning strike.

Known motor controllers include large capacitance electrolytic capacitors (i.e., above about 10 microfarads per kilowatt ($\mu$F/kW)) on a rectified direct current (DC) link that provide a secondary function of preventing large voltage surges or transients (i.e., above about 500 volts (V)) that may occur on an AC line input connection due to switching or lightning, creating an overvoltage failure mode on the DC link.

If instead of large electrolytic capacitors, a low capacitance (i.e., between about 0.1 $\mu$F/kW and about 10 $\mu$F/kW) film capacitor is used across the DC link, the motor controller may become susceptible to overvoltage failure modes. To prevent overvoltage failure, a voltage clamping circuit may be used. However, typical clamping circuits may not provide the same level of protection as the known large capacitance electrolytic capacitors, and accordingly, may not sufficiently protect the motor controller from a transient voltage.

BRIEF DESCRIPTION

In one aspect, a transient voltage protection system for conditioning power provided by an alternating current (AC) power line to an electric motor drive controller is provided. The power line includes a line conductor, a neutral conductor, and a ground conductor. The transient voltage protection system includes a first stage protection device coupled to an input of a rectifier of the motor drive controller. The first stage protection device is configured to suppress the transient voltage to prevent damage to the motor drive controller. The transient voltage protection system also includes a second stage protection device coupled between the rectifier and an inverter of the motor drive controller. The second stage protection device is configured to further suppress the transient voltage to prevent damage to the inverter.

In another aspect, a method of protecting an electric motor drive controller from a transient voltage is provided. The method includes coupling a first stage protection device to an input of a rectifier of the motor drive controller. The first stage protection device is configured to suppress a transient voltage input into the motor drive controller by a power line to prevent damage to the motor drive controller. The method also includes coupling a second stage protection device between the rectifier and an inverter of the motor drive controller. The second stage protection device is configured to further suppress the transient voltage to prevent damage to the inverter.

In yet another aspect, an electric motor drive controller is provided. The motor drive controller includes a rectifier configured to convert an alternating current (AC) input voltage to a pulsed direct current (DC) voltage. The AC input voltage is received from an AC power line that includes a line conductor, a neutral conductor, and a ground conductor. The motor drive controller also includes an inverter configured to condition the pulsed DC voltage for driving an electric motor. The motor drive controller further includes a transient voltage protection system having a first stage protection device and a second stage protection device. The first stage protection device is coupled to an input of the rectifier and is configured to suppress a transient voltage input by the power line to prevent damage to the motor drive controller. The second stage protection device is coupled between the rectifier and the inverter and is configured to further suppress the transient voltage to prevent damage to the inverter.

DETAILED DESCRIPTION

Figure 1:
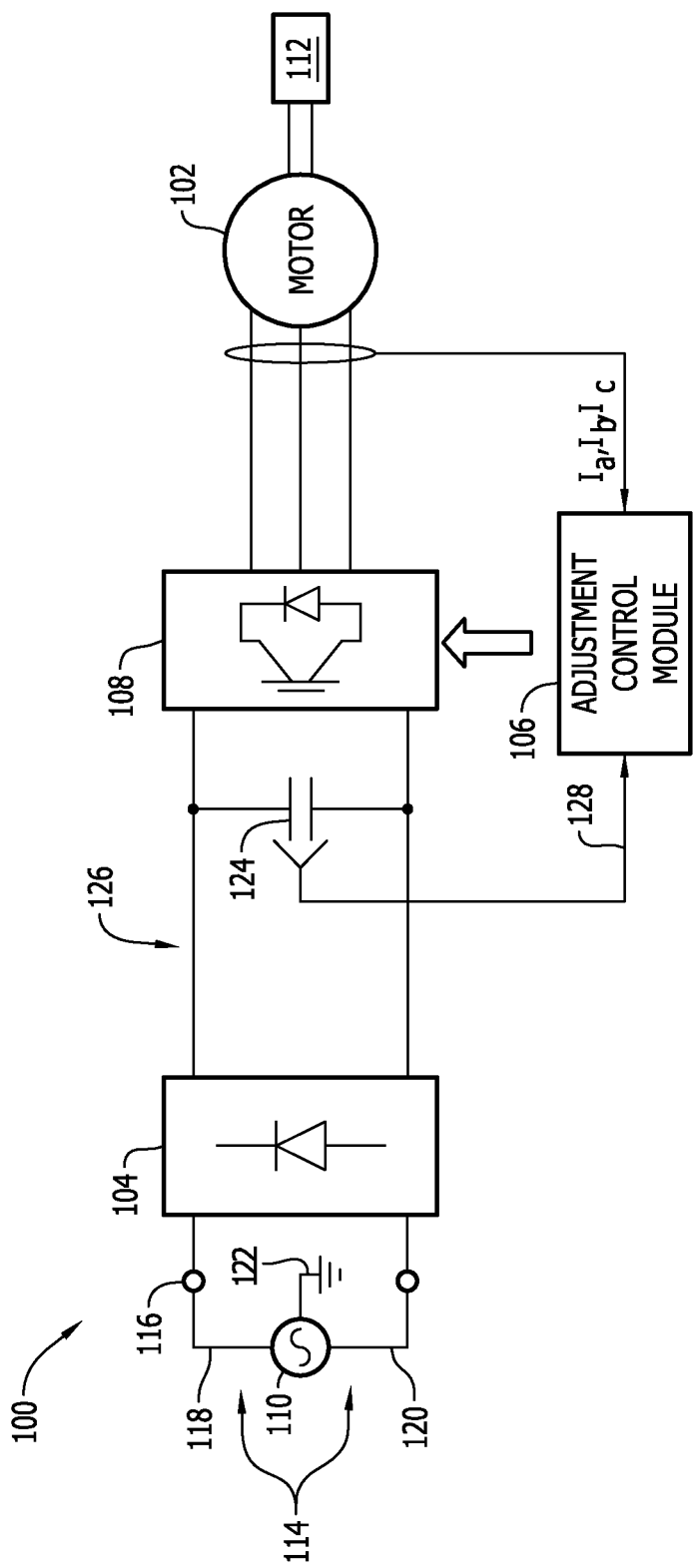
FIG. 1 is a block diagram of an exemplary electric motor drive controller that may be used with an electric motor.

FIG. 1 is a functional diagram that includes a motor drive controller 100 that may be used for operating an electric motor 102. Motor drive controller 100 includes a rectifier 104, an adjustment control module 106, and an inverter 108. Motor drive controller 100 is coupled to a power supply 110 for receiving input power to drive electric motor 102. Electric motor 102 is coupled to and drives a load 112.

In the exemplary embodiment, power supply 110 supplies a single-phase alternating current (AC) input voltage to motor drive controller 100. However, power supply 110 may supply any other type of input voltage that enables motor drive controller 100 to function as described herein. Power supply 110 includes an output power line 114 that is coupled to an input 116 of motor drive controller 100. In the exemplary embodiment, output power line 114 includes three conductors: a line conductor 118, a neutral conductor 120, and a ground conductor 122. Ground conductor 122 is typically coupled to earth ground. However, ground conductor 122 may be coupled to a chassis ground or any other grounding that enables motor drive controller 100 to function as described herein.

Rectifier 104 receives the AC input voltage from a power supply 110 and rectifies the AC input voltage to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor drive controller 100 to function as described herein.

In some embodiments, motor drive controller 100 includes a low-capacitance capacitor 124 that stores relatively small amounts of energy when input voltage is available. Capacitor 124 may have a capacitance of, for example, between about 0.1 µF/kW and about 10 µF/kW. More specifically, motor drive controller 100 does not include a comparatively large electrolytic capacitor (i.e., a high capacitance capacitor above about 10 µF/kW). In some embodiments, capacitor 124 is configured to filter out switching frequency harmonics of electric motor 102. In other embodiments, the relatively low capacitance of capacitor 124 reduces inrush input current to electric motor 102. Further, capacitor 124 may enable motor drive controller 100 to increase a line input power factor. In other embodiments, motor drive controller 100 does not include capacitor 124.

Motor drive controller 100 is configured to measure a voltage of a DC link 126, for example, through a voltage divider or a voltage sensor 128 coupled across capacitor 124. Motor drive controller 100 measures the voltage of DC link 126 downstream of rectifier 104. Adjustment control module 106 receives the measured voltage of DC link 126 and uses the measured voltage of DC link 126 in controlling electric motor 102 to produce torque when AC input voltage is zero. More specifically, adjustment control module 106 regulates a torque-producing component (q-axis) and a flux-producing component (d-axis) of phase currents Ia, Ib, and Ic provided to electric motor 102.

Figure 2:
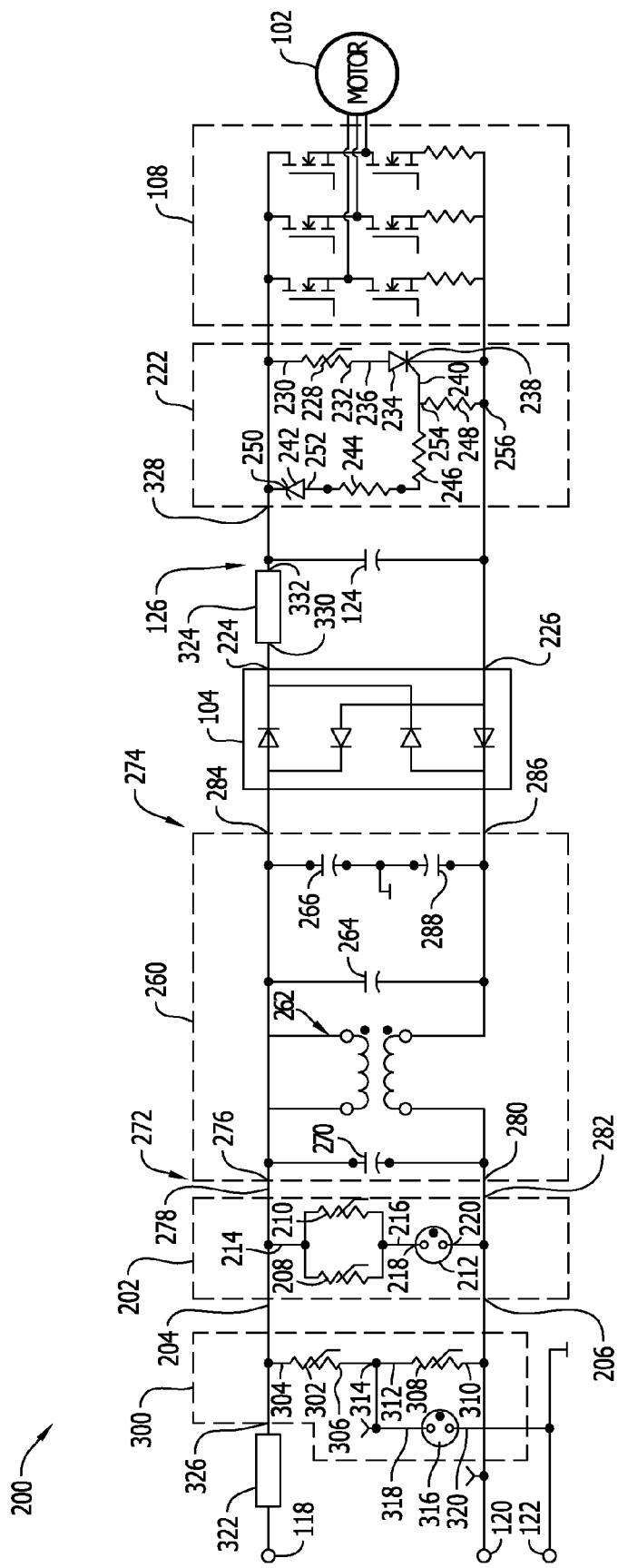
FIG. 2 is a circuit diagram of an exemplary embodiment of a transient voltage protection system that may be used with the electric motor drive controller shown in FIG. 1.

FIG. 2 is a circuit diagram of an exemplary embodiment of transient voltage protection system 200 that may be used with motor drive controller 100 (shown in FIG. 1). In the exemplary embodiment, transient voltage protection system 200 is configured to suppress transient voltages and to prevent ringing voltages within motor drive controller 100. A transient voltage, which may also be referred to as a voltage spike, may cause damage to components within motor drive controller 100 if the transient voltage is greater than a maximum operating limit of the component. A transient voltage may be caused by, for example, but not limited to, switching of loads within electric motor 102, switching of loads coupled to electric motor 102, and/or lightning strikes. Voltage transients may also prevent delivery of a stable output voltage. An unstable, oscillating voltage provided to motor drive controller 100 is referred to herein as a ringing voltage. Alternatively, a ringing voltage may include a sinusoidal voltage having an exponentially decreasing amplitude. A ringing voltage may also include an oscillating voltage with an increasing amplitude caused by resonance. Presence of a ringing voltage prevents proper operation of motor drive controller 100 and may also cause damage to motor drive controller 100 and/or electric motor 102.

In the exemplary embodiment, transient voltage protection system 200 is integrated within motor drive controller 100, which includes a rectifying circuit, for example, rectifier 104 (shown in FIG. 1), for converting an AC power input to a DC power output. Although shown integrated within motor drive controller 100, transient voltage protection system 200 may be used to protect any other suitable electrical device. Additionally or alternatively, transient voltage protection system 200 may be an external system that is coupled to motor drive controller 100.

In the exemplary embodiment, transient voltage protection system 200 is a two-stage system for suppressing transient voltages. More specifically, transient voltage protection system 200 includes a first stage protection device 202 and a second stage protection device 222.

In the exemplary embodiment, first stage protection device 202 is coupled downstream from power supply 110 and upstream from rectifier 104. First stage protection device 202 includes a first AC line input terminal 204 for coupling transient voltage protection system 200 to line conductor 118 (shown in FIG. 1). First stage protection device 202 also includes a second AC line input terminal 206 for coupling transient voltage protection system 200 to neutral conductor 120 (shown in FIG. 1). In the exemplary embodiment, first stage protection device 202 conditions electricity provided by power supply 110 entering motor drive controller 100.

In the exemplary embodiment, first stage protection device 202 includes a first voltage clamping device 208, a second voltage clamping device 210, and a gas discharge tube 212. First voltage clamping device 208 and second voltage clamping device 210 may include, but are not limited to, a metal oxide varistor (MOV), a Zener diode, a transient voltage suppression (TVS) diode, or any other voltage clamping device that enables first stage protection device 202 to function as described herein. First voltage clamping device 208 is coupled in parallel to second voltage clamping device 210. Each voltage clamping device 208 and 210 has a first end 214 and a second end 216. Voltage clamping devices 208 and 210 are coupled to first AC line input terminal 204 at first end 214. At second end 216, voltage clamping devices 208 and 210 are coupled to gas discharge tube 212 at a gas discharge tube first end 218. Gas discharge tube 212 is coupled in series with voltage clamping devices 208 and 210. A gas discharge tube second end 220 is coupled to second AC line input terminal 206.

First stage protection device 202 is configured to suppress transient voltages between line conductor 118 and neutral conductor 120. Suppressing transient voltages facilitates preventing damage to components included within and/or coupled to motor drive controller 100 caused by exposure to transient voltages. For example, during typical operation of motor drive controller 100, power supply 110 supplies a 240 volt AC power to first stage protection device 202. Voltage clamping devices 208 and 210 have high impedances, preventing current from flowing through voltage clamping devices 208 and 210. However, a voltage transient between line conductor 118 and neutral conductor 120 causes the impedance of voltage clamping devices 208 and 210 to lower (e.g., causing a clamped voltage between line conductor 118 and gas discharge tube 212), which enables the transient current to flow through first and second voltage clamping devices 208 and 210 to gas discharge tube 212. Gas discharge tube 212 also has a high impedance under normal operating voltages of motor drive controller 100. However, current may flow through gas discharge tube 212 upon application of a high voltage, such as a transient voltage. The combination of gas discharge tube 212 with first and second voltage clamping devices 208 and 210 is configured to protect motor drive controller 100 from open circuit voltages up to and exceeding about 6000 VDC or about 2300 amps.

In the exemplary embodiment, second stage protection device 222 is coupled downstream from rectifier 104 and upstream from inverter 108. More specifically, second stage protection device 222 is coupled to DC link 126 at a first rectifier output terminal 224 and a second rectifier output terminal 226 of rectifier 104. Second stage protection device 222 includes a third voltage clamping device 228 having a first end 230 coupled to DC link 126 and a second end 232.

Second stage protection device 222 also includes a semiconductor device 234 having an anode 236, a cathode 238, and a gate 240. Second end 232 of third voltage clamping device 228 is coupled in series to anode 236. Cathode 238 is coupled to second rectifier output terminal 226. In the exemplary embodiment, semiconductor device 234 is a semiconductor-controlled rectifier (SCR) 234. In alternative embodiments, semiconductor device 234 may be a metal-oxide-semiconductor field-effect transistor (MOSFET) or an insulated-gate bipolar transistor (IGBT).

Second stage protection device 222 further includes a Zener diode 242, a first resistor 244, a second resistor 246, and a third resistor 248, coupled in series between first rectifier output terminal 224 and second rectifier output terminal 226 of rectifier 104. Zener diode 242 includes a cathode 250 coupled to DC link 126, and an anode 252 coupled to first resistor 244. First resistor 244 is coupled in series to second resistor 246, and second resistor 246 is coupled in series to a first end 254 of third resistor 248. Third resistor first end 254 is also coupled to gate 240 of semiconductor device 234. A second end 256 of third resistor 248 is coupled to second rectifier output terminal 226.

If voltage within transient voltage protection system 200 exceeds a breakdown voltage of Zener diode 242, current flowing through Zener diode 242, first resistor 244, second resistor 246, and third resistor 248 is provided to gate 240 of SCR 234. SCR 234 conducts and functions as a short circuit. Third voltage clamping device 228 is configured to clamp the voltage to a necessary level to protect inverter 108 from being damaged. In the exemplary embodiment, third voltage clamping device 228 clamps the voltage at about 650 VDC or about 300 amps.

In some embodiments, transient voltage protection system 200 also includes an electromagnetic interference (EMI) filter 260 coupled to an output of first stage protection device 202. Filter 260 may include, but is not limited to including, at least one common mode inductor 262, also referred to as a common mode choke, and a plurality of capacitors, for example, a first capacitor 264, a second capacitor 266, a third capacitor 268, and a fourth capacitor 270. Filter 260 is configured to suppress electromagnetic interference. Filter 260 includes a filter input 272 and a filter output 274. Filter 260 receives power output by first stage protection device 202. Filter input 272 includes a first input terminal 276 coupled to a first output terminal 278 of first stage protection device 202 and a second input terminal 280 coupled to a second output terminal 282 of first stage protection device 202. Filter output 274 includes a first output terminal 284 and a second output terminal 286 that input power to rectifier 104.

In some embodiments, transient voltage protection system 200 also includes a third protection device 300 coupled downstream from power supply 110 and upstream from first stage protection device 202. Third protection device 300 includes a fourth voltage clamping device 302 having a first end 304 and a second end 306. Transient voltage protection system 200 also includes a fifth voltage clamping device 308 having a first end 310 and a second end 312. Fourth and fifth voltage clamping devices 302 and 308 may include, but are not limited to, a metal oxide varistor (MOV), a Zener diode, a transient voltage suppression (TVS) diode, or any other voltage clamping device that enables third protection device 300 to function as described herein. Fourth voltage clamping device first end 304 is coupled to first AC line input terminal 204 and second end 306 is coupled to first end 310 of fifth voltage clamping device 308. Second end 312 of fifth voltage clamping device 308 is coupled to second AC line input terminal 206. The coupling of fourth and fifth voltage clamping devices 302 and 308 forms a common node 314. Fourth and fifth voltage clamping devices 302 and 308 are configured to clamp a transient voltage between first AC line input terminal 204 and second AC line input terminal 206 that is above a typical operating voltage level for motor drive controller 100 but below a rated maximum voltage level for fourth and fifth voltage clamping devices 302 and 308. For example, fourth voltage clamping device 302 may be rated for 500 volt operation and fifth voltage clamping device 308 may be rated for 500 volt operation. In this example, fourth voltage clamping device 302 and fifth voltage clamping device 308 clamp a transient voltage that is above 1000 volts to approximately 1000 volts. Therefore, motor drive controller 100 will not be exposed to the full transient voltage, but rather, will only be exposed to 1000 volts.

In the exemplary embodiment, third protection device 300 further includes a spark gap device 316 that couples node 314 to ground conductor 122. For example, spark gap device 316 may include a gas discharge tube, at least two conductors separated a predetermined distance by air, or any other suitable voltage surge protection device that allows transient voltage protection system 200 to function as described herein. In some embodiments, spark gap device 316 is configured to conduct at 3600 DC volts, +/−20% (e.g., 2880 VDC to 4320 VDC), and configured to protect motor drive controller 100 and/or electric motor 102 from open circuit voltages up to and exceeding 6000 VDC.

In the exemplary embodiment, first end 304 of fourth voltage clamping device 302 is coupled to first AC line input terminal 204, second end 306 of fourth voltage clamping device 302 is coupled to a first end 318 of spark gap device 316, and a second end 320 of spark gap device 316 is coupled to ground conductor 122. Spark gap device 316, in combination with fourth voltage clamping device 302, is configured to suppress transient voltages between line conductor 118 and ground conductor 122. Suppressing transient voltages facilitates preventing damage to components coupled to or included within motor drive controller 100 caused by exposure to transient voltages. For example, during typical operation of motor drive controller 100, power supply 110 supplies a 240 volt AC power to third protection device 300. During typical operation, fourth voltage clamping device 302 has a high impedance, preventing current from flowing through fourth voltage clamping device 302. However, a voltage transient between line conductor 118 and ground conductor 122 causes the impedance of fourth voltage clamping device 302 to lower (e.g., causing a clamped voltage between first AC line input terminal 204 and spark gap device 316), which enables transient current to flow through fourth voltage clamping device 302 and into spark gap device 316. Spark gap device 316 also has a high impedance under normal operating voltages of motor drive controller 100. However, current may flow through spark gap device 316 upon application of a high voltage, for example, a transient voltage. In other words, a transient voltage causes fourth voltage clamping device 302 to shunt the current created by the high voltage to spark gap device 316, which shunts the current to ground conductor 122, thereby protecting components coupled to third protection device 300 from the transient voltage.

Further, in the exemplary embodiment, fifth voltage clamping device 308 is coupled between second AC line input terminal 206 and first end 318 of spark gap device 316. More specifically, first end 310 of fifth voltage clamping device 308 is coupled to second AC line input terminal 206, second end 312 of fifth voltage clamping device 308 is coupled to first end 318 of spark gap device 316, and second end 320 of spark gap device 316 is coupled to ground conductor 122. Spark gap device 316, in combination with fifth voltage clamping device 308, is configured to suppress transient voltages between neutral conductor 120 and ground conductor 122. For example, during typical operation, fifth voltage clamping device 308 has a high impedance, substantially similar to an open circuit, preventing current from flowing through fifth voltage clamping device 308. However, when a high voltage (e.g., a voltage transient between neutral conductor 120 and ground conductor 122) is present across fifth voltage clamping device 308, the impedance of fifth voltage clamping device 308 lowers (e.g., causing a clamped voltage between second AC line input terminal 206 and spark gap device 316), which enables the transient current to flow through fifth voltage clamping device 308 to spark gap device 316. As described above, spark gap device 316 also has a high impedance under normal operating voltages of motor drive controller 100. However, current may flow through spark gap device 316 upon application of a high voltage, for example, a transient voltage. In other words, a transient voltage causes fifth voltage clamping device 308 to shunt the current created by the high voltage to spark gap device 316, which shunts the current to ground conductor 122, thereby protecting components coupled to third protection device 300 from the transient voltage.

In the exemplary embodiment, transient voltage protection system 200 may include a first intentional weak link 322. First intentional weak link 322 and second intentional weak link 324 may include, for example, a fuse, a circuit breaker, or a thinned-down trace on a printed circuit board (PCB). In the exemplary embodiment, first intentional weak link 322 is coupled between first AC line input terminal 204 and a first input terminal 326 of third protection device 300. First intentional weak link 322 is configured to open upon failure or malfunction of a component coupled to transient voltage protection system 200, for example, failure of a component within rectifier 104. First intentional weak link 322 provides a known area of weakness that will open as a result of a failure or malfunction of a component within motor drive controller 100, preventing damage to other components of motor drive controller 100. First intentional weak link 322 also provides a predictable failure point, which facilitates efficient troubleshooting of motor drive controller 100.

The methods and systems described herein facilitate efficient and economical transient voltage protection to a motor controller. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

A technical effect of the methods and systems described herein may include one or more of: (a) coupling a first stage protection device to an input of a rectifier of the motor drive controller, the first stage protection device configured to suppress a transient voltage input into the motor drive controller by a power line to prevent damage to the motor drive controller; and (b) coupling a second stage protection device between the rectifier and an inverter of the motor drive controller, the second stage protection device configured to further suppress the transient voltage to prevent damage to the inverter.

Embodiments of the systems and methods described herein facilitate suppressing transient voltages and providing conditioned power to a device. More specifically, the methods and systems described herein facilitate protecting a motor controller and electric motor from damage that may be caused by a transient voltage. Moreover, the systems and methods described herein enable a manufacturer to produce a motor drive controller for an electric motor without including a typical high capacitance capacitor, while maintaining an ability to protect the motor drive controller from transient voltages. Accordingly, manufacturers may produce less expensive and less bulky motor drive controllers compared to typical motor drive controllers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transient voltage protection system for conditioning power provided by an alternating current (AC) power line to an electric motor drive controller, the power line including a line conductor, a neutral conductor, and a ground conductor, said transient voltage protection system comprising:
a first stage protection device coupled to an input of a rectifier of the motor drive controller, said first stage protection device configured to suppress a transient voltage between the line conductor and the neutral conductor to prevent damage to the motor drive controller, said first stage protection device comprising:
a first voltage clamping device having a first end coupled to the line conductor and a second end;
a second voltage clamping device coupled electrically in parallel to said first voltage clamping device and having a first end coupled to the line conductor and a second end; and
a gas discharge tube coupled in series between the neutral conductor and said second ends of said first and second voltage clamping devices; and
a second stage protection device coupled between the rectifier and an inverter of the motor drive controller, said second stage protection device configured to further suppress the transient voltage to prevent damage to the inverter, said second stage protection device comprising:
a voltage clamping device having a first end and a second end, said first end coupled to a direct current (DC) link of the motor drive controller at a first output terminal of the rectifier; and
a semiconductor device coupled in series to said voltage clamping device between said second end of said voltage clamping device and a second output terminal of the rectifier.

2. A system in accordance with claim 1, wherein each of said first and second voltage clamping devices comprises one of a metal oxide varistor, a Zener diode, and a transient voltage suppression diode.

3. A system in accordance with claim 1, wherein each of said first and second voltage clamping devices further comprises:
   a first end coupled to the line conductor of the power line; and
   a second end coupled to a first end of said gas discharge tube.

4. A system in accordance with claim 3, wherein said gas discharge tube further comprises a second end coupled to the neutral conductor of the power line.

5. A system in accordance with claim 1, wherein said first stage protection device is coupled to an input of an electromagnetic interference (EMI) filter positioned between said first stage protection device and the rectifier.

6. A system in accordance with claim 1, wherein said first stage protection device is coupled to an inductor positioned between said first stage protection device and the rectifier.

7. A system in accordance with claim 1, wherein said first stage protection device is configured to suppress transient voltages up to approximately 6,000 volts.

8. A system in accordance with claim 1, wherein said voltage clamping device comprises one of a metal oxide varistor, a Zener diode, and a transient voltage suppression diode.

9. A system in accordance with claim 1, wherein said second stage protection device further comprises:
   a Zener diode comprising an anode and a cathode, said cathode coupled to the DC link at said first output terminal of the rectifier;
   a first resistor coupled in series to said anode of said Zener diode;
   a second resistor coupled in series to said first resistor; and
   a third resistor having a first end and a second end, said first end coupled to said second resistor and to a gate of said semiconductor device, said second end coupled to said second output terminal of the rectifier.

10. A system in accordance with claim 9, wherein when a level of voltage at said second stage protection device exceeds a breakdown voltage of said Zener diode, said Zener diode, said first, second, and third resistors enable current to flow to said gate of said semiconductor device, and said voltage clamping device clamps voltage to a predetermined level to protect the inverter.

11. A system in accordance with claim 1, further comprising a capacitor coupled to a DC link of the motor drive controller between the rectifier and said second stage protection device, said capacitor having a capacitance between about 0.1 µF/kW and about 10 µF/kW.

12. A method for protecting an electric motor drive controller from a transient voltage, said method comprising:
   coupling a first end of a first voltage clamping device electrically in parallel to a first end of a second voltage clamping device, and coupling a first end of a gas discharge tube in series to second ends of the first and second voltage clamping devices to define a first stage protection device;
   coupling the first stage protection device to an input of a rectifier of the motor drive controller such that the first ends of the first and second voltage clamping devices are coupled to a line conductor and a second end of the gas discharge tube is coupled to a neutral conductor, the first stage protection device configured to suppress a transient voltage between the line conductor and the neutral conductor to prevent damage to the motor drive controller; and
   coupling a second stage protection device between the rectifier and an inverter of the motor drive controller, the second stage protection device configured to further suppress the transient voltage to prevent damage to the inverter, wherein coupling the second stage protection device further comprises:
   coupling a first end of a third voltage clamping device to a direct current (DC) link of the motor drive controller at a first output terminal of the rectifier; and
   coupling a semiconductor device electrically in series to a second end of the first voltage clamping device and a second output terminal of the rectifier.

13. An electric motor drive controller comprising:
   a rectifier configured to convert an alternating current (AC) input voltage to a pulsed direct current (DC) voltage, the AC input voltage received from an AC power line that includes a line conductor, a neutral conductor, and a ground conductor;
   an inverter configured to condition the pulsed DC voltage for use in driving an electric motor; and
   a transient voltage protection system comprising:
   a first stage protection device coupled to an input of said rectifier, said first stage protection device configured to suppress a transient voltage between the line conductor and the neutral conductor to prevent damage to the motor drive controller, said first stage protection device comprising:
      a first voltage clamping device having a first end coupled to the line conductor and a second end;
      a second voltage clamping device coupled electrically in parallel to said first voltage clamping device and having a first end coupled to the line conductor and a second end; and
      a gas discharge tube coupled in series between the neutral conductor and said second ends of both of said first and second voltage clamping devices; and
   a second stage protection device coupled between said rectifier and said inverter, said second stage protection device configured to further suppress the transient voltage to prevent damage to said inverter, said second stage protection device comprising:
      a voltage clamping device having a first end and a second end, said first end coupled to a direct current (DC) link of the motor drive controller at a first output terminal of the rectifier; and
      a semiconductor device coupled in series to said voltage clamping device between said second end of said voltage clamping device and a second output terminal of the rectifier.

14. A controller in accordance with claim 13, wherein said second stage protection device comprises:
   a Zener diode comprising an anode and a cathode, said cathode coupled to the DC link at said first output terminal of said rectifier;
   a first resistor coupled in series to said anode of said Zener diode;
   a second resistor coupled in series to said first resistor; and
   a third resistor comprising a first end and a second end, said first end of said third resistor coupled to said second resistor and to a gate of said semiconductor device, said second end of said third resistor coupled to said second output terminal of said rectifier.

* * * * *